UNITED STATES PATENT OFFICE.

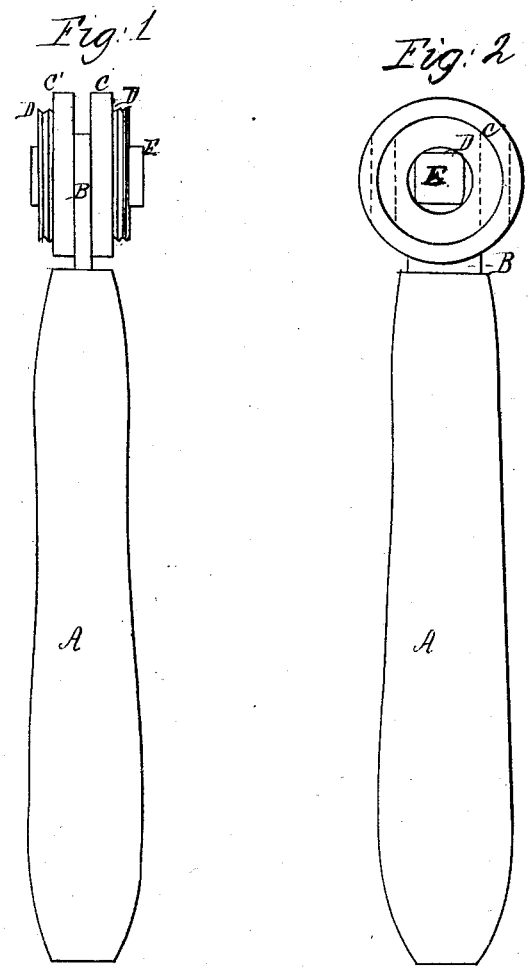

GEORGE C. TODD, OF LYNN, MASSACHUSETTS.

EDGE-KEY FOR MAKING AND POLISHING THE EDGES OF BOOT AND SHOE SOLES.

Specification of Letters Patent No. 16,128, dated November 25, 1856.

*To all whom it may concern:*

Be it known that I, GEO. C. TODD, of Lynn, in the county of Essex and Commonwealth of Massachusetts, have invented a new and useful Turned Edge-Key for Making and Polishing the Edges of Boot and Shoe Soles; and I do hereby declare that the following is a full, clear, and exact description of the construction and operation of the same, reference being had to the annexed drawings, making a part of this specification, in which—

Figure 1 is a front view of the tool, and Fig. 2 a side view of the same.

Similar letters refer to like parts in both figures.

The drawings are intended to be as large as a working tool.

A is the handle of wood, or other suitable material.

B is a metallic shank, one end of which is driven fast into the handle, A; through the opposite end of B is a hole sufficiently large to admit the screw-bolt, E.

C D, and C' D', are two disks of steel, or other suitable metal, through the centers of which are round holes for receiving the bolt, E, which, passing through disk, D, C, and shank, B, screws into disk, C' D', thereby confining the two disks to the shank B. These disks, (being cast, or forged, and a hole drilled through their centers) are put into a lathe, turned, as seen in Fig. 1, or otherwise, and polished. It is obvious that the shoulders of the disks may be turned of any desirable depth, and the creases and threads upon them, of any pattern so as to produce any requisite style of bead or finish. It is also obvious that the same handle and shank will answer for any number and variety of disks, which may be taken off, or put on, at pleasure. Or, if desirable for certain purposes, segments may be cut off of the disks, as represented by the dotted lines in Fig. 2.

The "edge keys," or "shoulder irons," in common use, are shaped somewhat like the handle of mine, the shoulders and beads of which are cut by hand with a file, and are consequently not only more expensive than mine, but also liable to be very irregular and imperfect.

Among the advantages possessed by my invention and the tools in common use, are the following:—

1st. A more perfect tool, and consequently capable of doing better work. My disks being turned and polished in a lathe, must, of necessity, in every part, be uniform and perfectly true—much more so than it is possible to make the kind of tools in common use, by hand, with a file.

2d. It possesses vastly greater durability. The rubbing surface of the common "edge keys," is about $\frac{1}{4}$ of an inch; whereas that of mine, being the whole circumference of the disks, will be more than a dozen times as large; for when one part of the circumference becomes too much worn for use, the disks may, by loosening the screw, E, be turned so as to bring a new part to the work.

3d. It may be worked with greater ease; for, the disks being perfect circles, the operator is not obliged to carry the tool at any particular angle, as is the case with the common kind of "edge-keys" to prevent the ends of the rubbing surface from denting in.

4th. There is much less liability of cutting, scratching, or marring, the "upper stock," with my invention than with the tools in common use.

5th. It is a great deal cheaper than the common kind, costing less to manufacture, at the outset, and lasting, as explained above, a dozen times as long.

What I claim as my invention and desire to secure by Letters Patent, is—

A turned, or circular, edge-key, constructed substantially as described, and for the objects specified.

GEORGE C. TODD. [L. S.]

Witnesses:
C. L. T. ATWATER,
W. B. O'NEAL.